United States Patent
Nelogal et al.

(10) Patent No.: US 11,449,230 B2
(45) Date of Patent: Sep. 20, 2022

(54) SYSTEM AND METHOD FOR INPUT/OUTPUT (I/O) PATTERN PREDICTION USING RECURSIVE NEURAL NETWORK AND PROACTION FOR READ/WRITE OPTIMIZATION FOR SEQUENTIAL AND RANDOM I/O

(71) Applicant: DELL PRODUCTS, LP, Round Rock, TX (US)

(72) Inventors: Chandrashekar Nelogal, Round Rock, TX (US); Arunava Das Gupta, Bangalore (IN); Niladri Bhattacharya, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 18 days.

(21) Appl. No.: 16/295,533

(22) Filed: Mar. 7, 2019

(65) Prior Publication Data
US 2020/0285386 A1 Sep. 10, 2020

(51) Int. Cl.
| | |
|---|---|
| G06F 3/06 | (2006.01) |
| G06F 7/58 | (2006.01) |
| G06N 3/08 | (2006.01) |
| G06N 3/04 | (2006.01) |

(52) U.S. Cl.
CPC ............. *G06F 3/061* (2013.01); *G06F 3/067* (2013.01); *G06F 3/0634* (2013.01); *G06F 3/0653* (2013.01); *G06F 7/582* (2013.01); *G06N 3/0454* (2013.01); *G06N 3/08* (2013.01)

(58) Field of Classification Search
USPC ....................................................... 711/103
See application file for complete search history.

(56) References Cited

U.S. PATENT DOCUMENTS

| | | | |
|---|---|---|---|
| 7,404,088 B2 | 7/2008 | Giobbi | |
| 7,543,124 B1 | 6/2009 | Accapadi et al. | |
| 9,600,378 B2 | 3/2017 | Nelogal et al. | |
| 2007/0168571 A1 | 7/2007 | Ramsey et al. | |
| 2011/0289277 A1* | 11/2011 | Takada ................... | G06F 12/123 711/136 |
| 2013/0227200 A1* | 8/2013 | Cometti ................ | G06F 3/0629 711/103 |
| 2016/0224437 A1 | 8/2016 | Nelogal et al. | |
| 2016/0283243 A1 | 9/2016 | Jung | |
| 2017/0242686 A1 | 8/2017 | Vidyadhara et al. | |
| 2017/0344294 A1 | 11/2017 | Mishra et al. | |
| 2019/0354489 A1* | 11/2019 | Gupta .................... | G06F 12/128 |
| 2019/0370434 A1* | 12/2019 | Sha ......................... | G06F 30/27 |
| 2020/0177468 A1* | 6/2020 | Quachtran .............. | H04L 41/16 |
| 2020/0210817 A1* | 7/2020 | Chatterjee ............ | G06N 3/0481 |

(Continued)

*Primary Examiner* — Charles Rones
*Assistant Examiner* — Jonah C Krieger
(74) *Attorney, Agent, or Firm* — Larson Newman, LLP

(57) ABSTRACT

An information handling system may have a long short term memory (LSTM) that receives Input/Output (I/O) parameters, and produces a prediction output by operation of a recursive neural network (RNN). An I/O optimizer provides the I/O parameters to the LSTM and receives the prediction output from the LSTM. The I/O optimizer may include a manager module configured to provide control signals to control gates for controlling application of the I/O parameters and the prediction output, and a collector module configured to collect the I/O parameters.

19 Claims, 5 Drawing Sheets

(56) References Cited

U.S. PATENT DOCUMENTS

2020/0233612 A1* 7/2020 Dalmatov ............. G06F 3/0631
2020/0233855 A1* 7/2020 Masud ................ G06F 16/2365
2020/0257982 A1* 8/2020 Kim ....................... G06N 20/10

* cited by examiner

SYSTEM AND METHOD FOR INPUT/OUTPUT (I/O) PATTERN PREDICTION USING RECURSIVE NEURAL NETWORK AND PROACTION FOR READ/WRITE OPTIMIZATION FOR SEQUENTIAL AND RANDOM I/O

FIELD OF THE DISCLOSURE

The present disclosure generally relates to information handling systems, and more particularly to read and write optimization of Input/Output (I/O) operations in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system may have a long short term memory (LSTM) that receives Input/Output (I/O) parameters, and produces a prediction output by operation of a recursive neural network (RNN). An I/O optimizer provides the I/O parameters to the LSTM and receives the prediction output from the LSTM. The I/O optimizer may include a manager module configured to provide control signals to control gates for controlling application of the I/O parameters and the prediction output, and a collector module configured to collect the I/O parameters.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
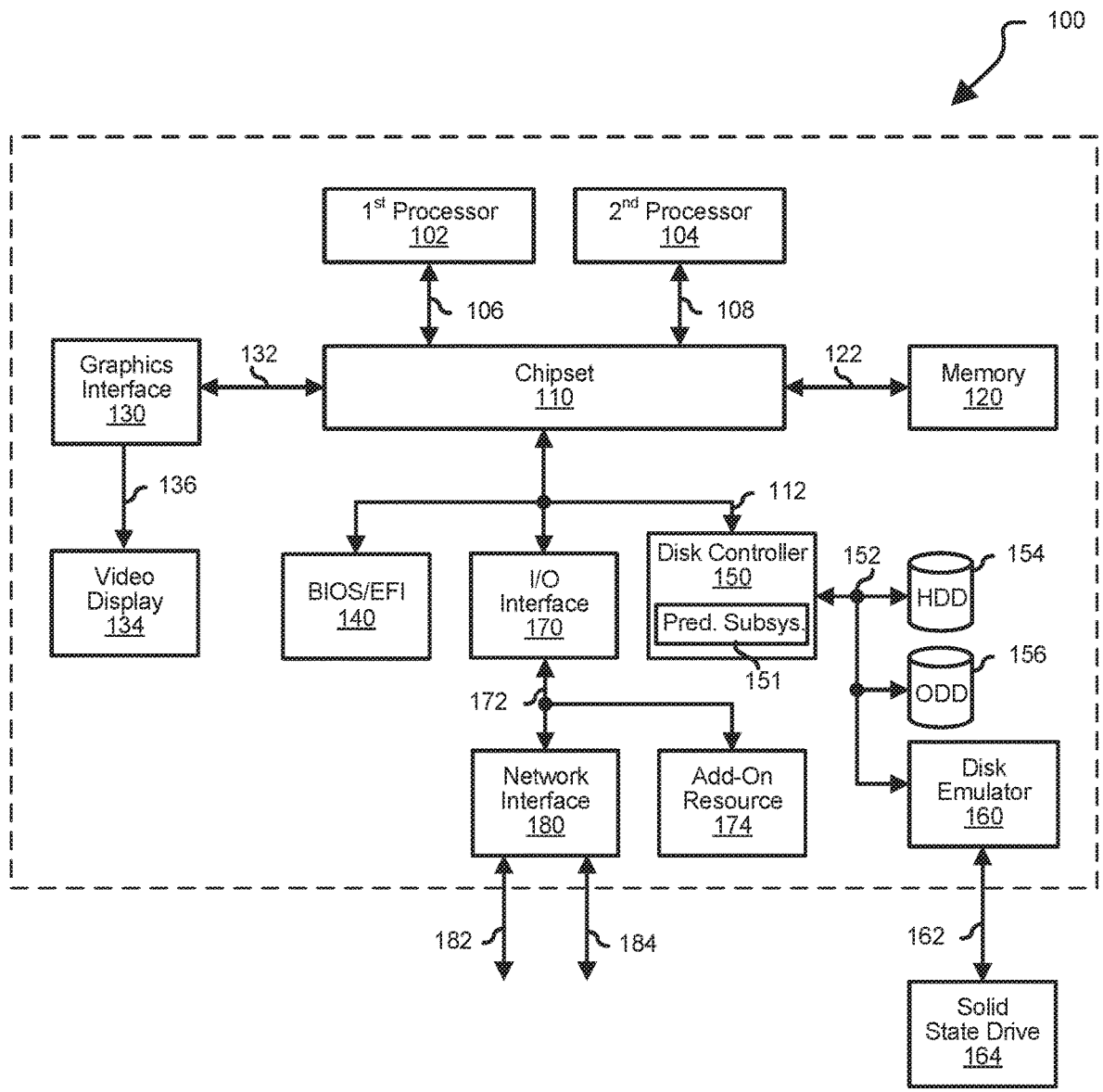
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various Input/Output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic Input/Output system/extensible firmware interface (BIOS/EFI) module 140, a disk controller 150, a disk emulator 160, an I/O interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 comprises predictive subsystem 151. Predictive subsystem 151 utilizes a neural network, such as a recursive neural network (RNN), to perform deep learning of I/O patterns and to create a model to predict upcoming I/O requests. Both read and write requests can be predicted. By predicting read requests, pages of data can be pre-fetched for caching. By predicting write requests, write operations can be optimized. Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
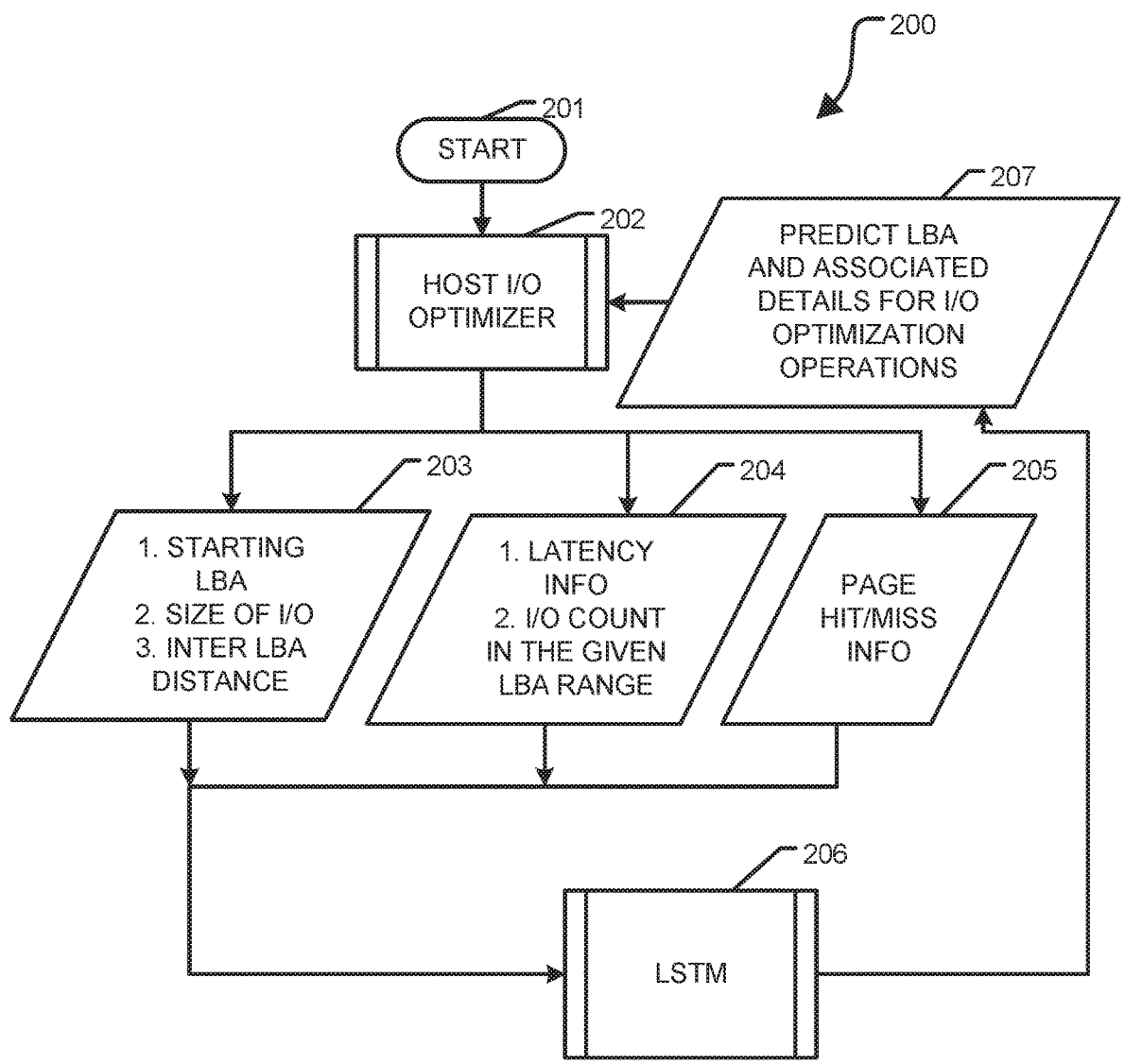
FIG. 2 is a flow diagram illustrating a method for predictively optimizing input-output (I/O) operations of an information handling system according to an embodiment of the present disclosure.

FIG. 2 shows a method for predictively optimizing I/O operations of an information handling system according to an embodiment of the present disclosure. Method 200 begins at block 201 and continues to block 202. At block 202, a host I/O optimizer sets parameter values of parameters of a data storage controller, such as disk controller 150 of FIG. 1. From block 202, method 200 continues to blocks 203, 204, and 205. Blocks 203, 204, and 205 can be performed selectively as one, two, or all three of blocks 203, 204, and 205. Blocks 203, 204, and 205 can be performed in parallel, in series, or in a combination thereof. At block 203, information characteristic of data being transferred is obtained. As an example, a type of I/O request (e.g., read or write), a starting logical block address (LBA) of the request, a size of I/O data transferred according to the request, and a inter-LBA distance between I/O requests can be obtained. At block 204, other information characteristic of data being transferred is obtained. As an example, latency information as to durations over which I/O requests are completed and counts of numbers of I/O requests in a pertinent LBA address range are obtained. At block 205, information characteristic of performance of I/O predictive optimization is obtained. As an example, page hit-and-miss (hit/miss) information characterizing whether needed data for a processing operation was pre-fetched (e.g., a hit) or not (e.g., a miss) from a storage device is obtained.

From one or more of blocks 203, 204, and 205, method 200 continues to block 206, where a long short term memory (LSTM) stores new information, forgets old information, or retains old information representative of one or more patterns observed in the information obtained from one or more of blocks 203, 204, and 205. From block 206, method 200 continues to block 207. At block 207, a LBA and associated parameter values are selected for I/O optimization operations based on the output of the LSTM. From block 207, method 200 returns to block 202. At block 202, the LBA and selected parameter values are used by the host I/O optimizer to adjust the operation of a data storage subsystem for optimized I/O operations, such as optimized read operations and optimized write operations.

Figure 3:
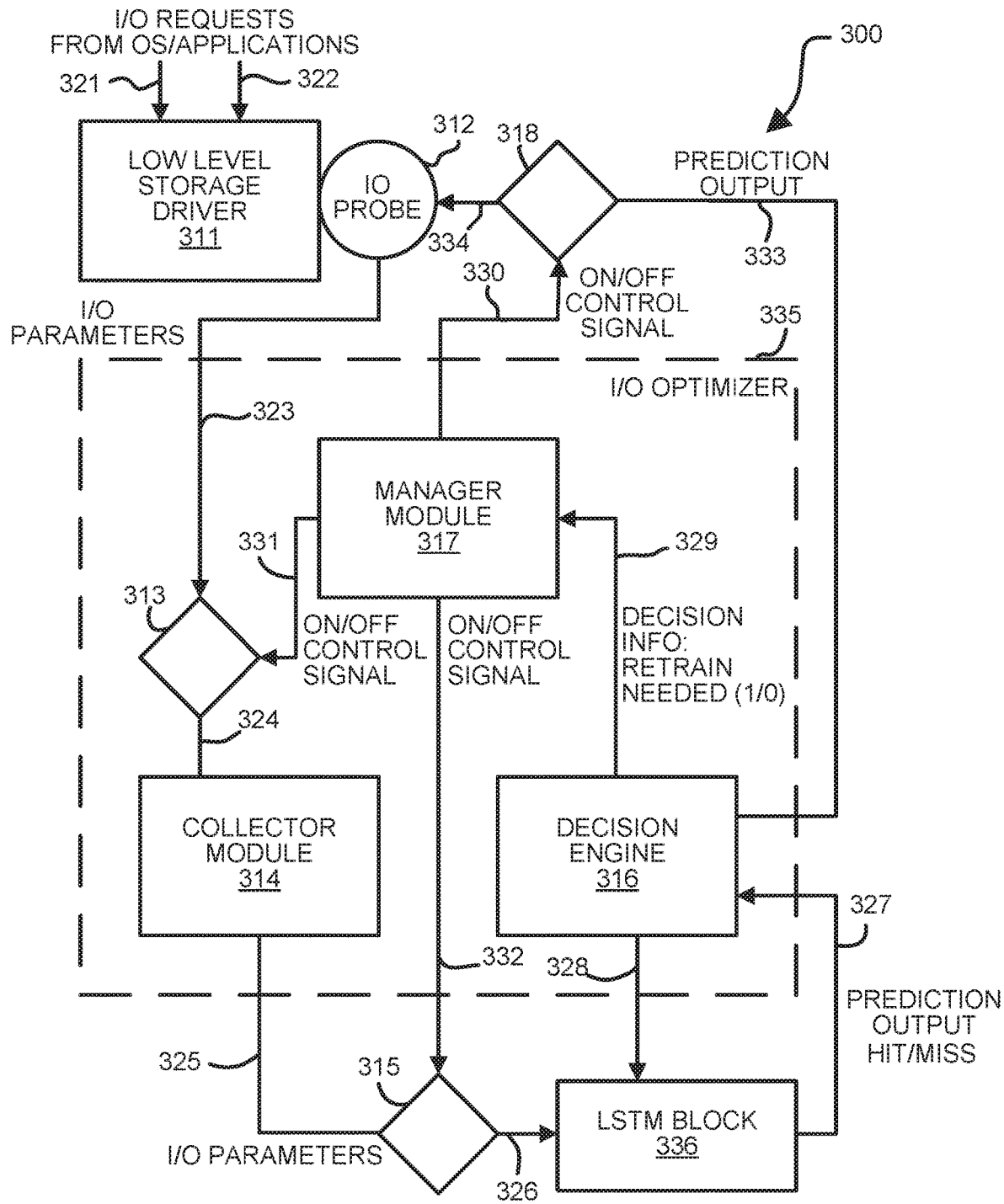
FIG. 3 is a block diagram illustrating a predictive subsystem for predictively optimizing I/O operations of an information handling system according to an embodiment of the present disclosure.

FIG. 3 shows a predictive subsystem for predictively optimizing I/O operations of an information handling system according to an embodiment of the present disclosure. Predictive subsystem 300 may be used to implement a data storage controller, such as disk controller 150 of FIG. 1. In accordance with such an example, predictive subsystem 300 may be used to implement predictive subsystem 151 of FIG. 1. Predictive subsystem 300 comprises I/O optimizer 335. I/O optimizer 335 may be used, for example, as described with respect to block 202 of FIG. 2. I/O optimizer 335 comprises control gate 313, collector module 314, decision engine 316, and manager module 317. Predictive subsystem 300 further comprises low level storage driver 311, I/O probe 312, control gate 315, control gate 318, and LSTM block 336. LSTM block 336 may be used, for example, as described with respect to block 206 of FIG. 2.

I/O requests from an operating system (OS) or one or more application programs executed on the information handling system are provided to low level storage driver 311 via one or more I/O request inputs 321 and 322. Information pertaining to the operation of low level storage driver 311 is obtained by I/O probe 312. As an example, I/O probe 312 obtains I/O parameters from low level storage driver 311. I/O probe 312 provides the information it obtained, such as I/O parameters, to control gate 313 via input 323 of I/O optimizer 335. Manager module 317 controls control gate 313 via control link 331, for example, using an on and off (on/off) control signal. An output of control gate 313 is provided to collector module 314 via input 324. Collector module 314 provides information, such as I/O parameters, to control gate 315 via input 325. Manager module 317 controls control gate 315 via control link 332, for example, using an on/off control signal. An output of control gate 315 is provided to LSTM block 336 via input 326. LSTM block 336 analyzes the information provided to it an produces a prediction output, which it provides to decision engine 316 at input 327. Decision engine 316 obtains performance measurement information, such as hit/miss information, and provides such information to LSTM block 336 via hit/miss measured input 328. Decision engine 316 makes a decision whether retraining of LSTM block 336 is needed or not. If so, decision engine 316 provides decision information indicating that retraining is needed to manager module 317 via input 329. Decision engine 316 provides a prediction output to control gate 318 via input 333. Manager module 317 controls control gate 318 via control link 330, for example, using an on/off control signal. An output of control gate 318 is provided to I/O probe 312 via input 334.

Figure 4:
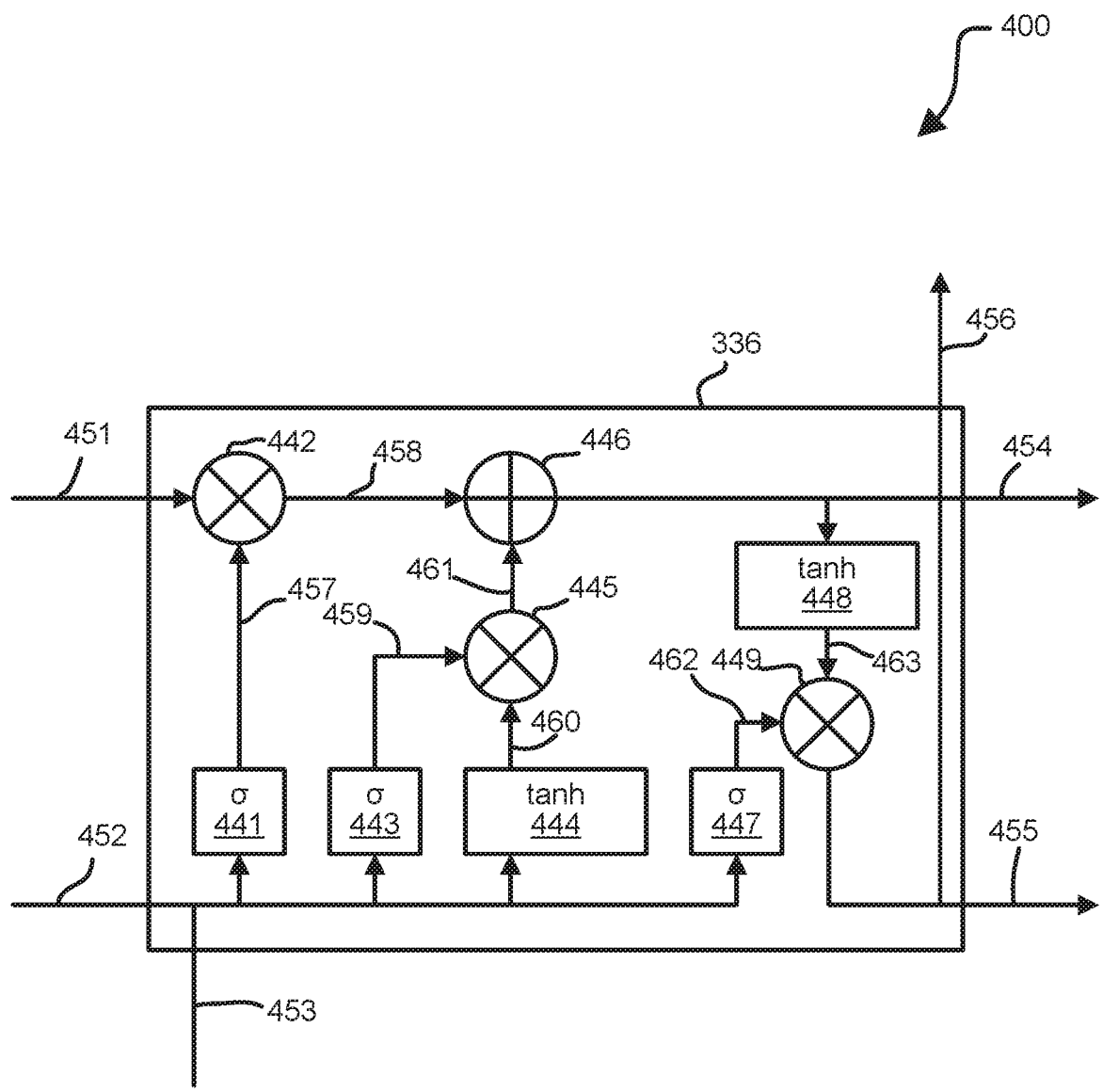
FIG. 4 is a block diagram illustrating a long short term memory (LSTM) of a predictive subsystem for predictively optimizing I/O operations of an information handling system according to an embodiment of the present disclosure.

FIG. 4 shows an LSTM of a predictive subsystem for predictively optimizing I/O operations of an information handling system according to an embodiment of the present disclosure. LSTM 400 comprises LSTM cell 401. LSTM 400 may be used to implement, for example, LSTM block 336 of FIG. 3 and to perform LSTM operations described with respect to block 206 of FIG. 2. LSTM cell 401 comprises a forget gate neural network layer, an input gate neural network layer, and an output gate neural network layer. The forget gate neural network layer comprises sigmoid neural network layer 441 and pointwise multiplication block 442. Sigmoid neural network layer 441 receives previous cell output 452 and input 453 and provides output 457.

Pointwise multiplication block 442 receives previous cell state output 451, multiplies previous cell state output 451 by output 457, and provides output 458. The input gate neural network layer comprises sigmoid neural network layer 443, nonlinear neural network layer 444, pointwise multiplication block 445, and pointwise summation block 446. Each of sigmoid neural network layer 443 and nonlinear neural network layer 444 receive previous cell output 452 and input 453. Sigmoid neural network layer 443 provides output 459 to pointwise multiplication block 445. Nonlinear neural network layer 444 provides output 460 to pointwise multiplication block 445. Nonlinear neural network layer 444 may implement, for example, a transfer function according to a hyperbolic tangent function, labelled tan h.

Pointwise multiplication block 445 multiplies output 459 and output 460 and provides output 461 to pointwise summation block 446. Pointwise summation block 446 adds output 458 and output 461 and provides cell state output 454, which is provided to nonlinear neural network layer 448 and to a previous cell state input of a subsequent LSTM cell. The output gate neural network layer comprises sigmoid neural network layer 447, nonlinear neural network layer 448, and pointwise multiplication block 449. Sigmoid neural network layer 447 receives previous cell output 452 and input 453 and provides output 462 to pointwise multiplication block 449. Nonlinear neural network layer 448 receives cell state output 454, applies a nonlinear transfer function, for example, a hyperbolic tangent transfer function, labelled tan h, and provides output 463 to pointwise multiplication block 449. Pointwise multiplication block 449 multiplies output 462 and output 463 and provides cell output 455 to a previous cell input of a subsequent LSTM cell. Pointwise multiplication block 449 also provides its output as cell output 456.

Figure 5:
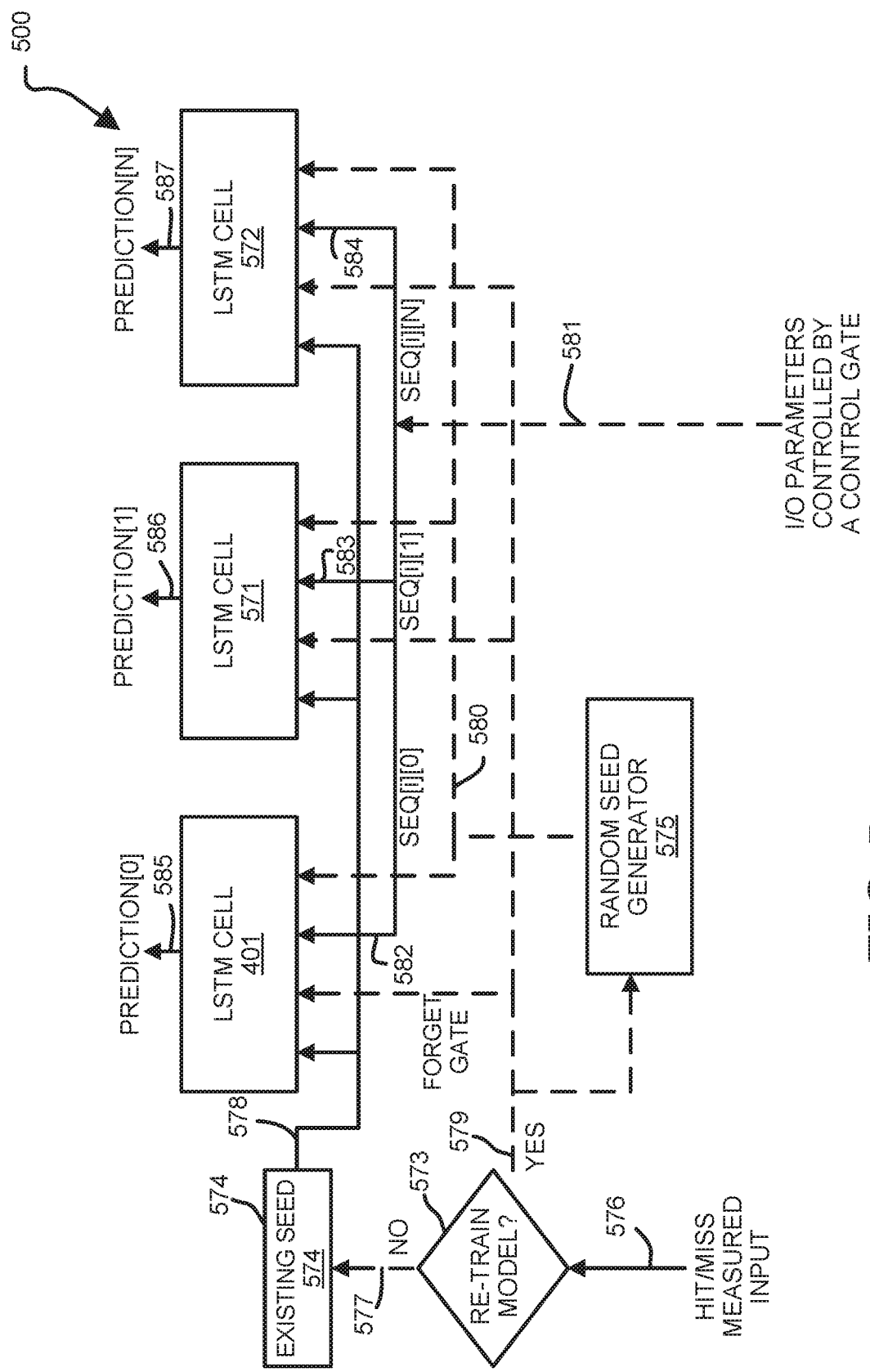
FIG. 5 is a block diagram illustrating an LSTM subsystem of a predictive subsystem for predictively optimizing I/O operations of an information handling system according to an embodiment of the present disclosure.

FIG. 5 is a block diagram illustrating a LSTM subsystem of a predictive subsystem for predictively optimizing I/O operations of an information handling system according to an embodiment of the present disclosure. LSTM subsystem 500 comprises LSTM cell 401, LSTM cell 571, LSTM cell 572, decision block 573, existing seed register 574, and random seed generator 575. Performance measurement information, such as hit/miss information, is provided at hit/miss measured input 576, for example, from decision engine 316 of FIG. 3. Decision block 573 receives hit/miss measured input 576 and makes a decision whether retraining of the model established within LSTM subsystem 500 is needed. If not, decision block 577 provides output 577 to existing seed register 574, which provides an existing seed via existing see output 578 to each of LSTM cells 401, 571, and 572. If retraining is needed, decision block 577 provides output 579 to random seed generator 575 and to a respective forget gate input of each of LSTM cells 401, 571, and 572. In response to output 579, LSTM cells 401, 571, and 572 forget their previous stored information and random seed generator generates a new seed value, which it provides to LSTM cells 401, 571, and 572 via random seed output 580. Information, such as I/O parameters provided by collector module 314 via input 325, control gate 315, and input 326 of FIG. 3, is provided via input 581 to SEQ[i] inputs 582, 583, and 584 of LSTM cells 401, 571, and 472, respectively. Based on SEQ[i] inputs 582, 583, and 584, and their current internal states, LSTM cells 401, 571, and 572 provide predictions 585, 586, and 587, respectively.

In accordance with at least one embodiment, a prediction subsystem predicts a future I/O pattern using a recursive neural network (RNN) trained using previous and current I/O parameter values, and the predicted future I/O pattern is used proactively to guide read/write optimization for sequential and random I/O operations to occur in the future. Operation according to the read/write optimization is monitored, and performance measurement information obtained from such monitoring is used to determine whether retraining is to be performed on the RNN. If the read/write optimization is performing acceptably, no retraining is initiated, although the optimization may be updated through continued deep learning of the RNN as additional I/O parameter values are provided to the RNN. As shown in the accompanying drawings, the RNN may be implemented using a LSTM subsystem. If the read/write optimization is performing unacceptably, retraining is initiated, and further performance measurement information is obtained for the further read/write optimization resulting from the retraining. One or more instances of retraining can be performed until the optimization is deemed to be performing acceptably.

In accordance with at least one embodiment, a method and apparatus are provided to predict and optimize a data storage subsystem for storage workloads from software-defined storage (SDS), clustered/multi-node environments, and virtualized information handling system environments. Technological improvement is provided over traditional approaches which merely adapt to sequential I/O workload after stream detection but are unable to recognize patterns in a seemingly random I/O workload. Such traditional approaches typically result in inefficient cache utilization by merely populating a caching tier in response to cache misses resulting from the seemingly random I/O workload. By recognizing an I/O pattern, even from a seemingly random I/O workload, predicting future I/O activities, and proactively caching data and configuring the data storage subsystem in a manner expected to be relevant to the future I/O activities, improvement over traditional approaches is provided.

In accordance with at least one embodiment, deep learning, as implemented using a neural network, is configured to recognize an I/O pattern and to create a model to predict upcoming I/O requests (both read and write) and to pre-fetch data pages for caching or optimize the write operations through storage controllers (e.g., serial attached small computer system interface (SCSI) (SAS), serial advanced technology attachment (SATA), or non-volatile memory express (NVMe) storage controllers).

In accordance with at least one embodiment, a neural network, such as a RNN, for example, a RNN comprising a LSTM subsystem, develops a model which takes the I/O requests type (read/write) and other parameters of the I/O requests such as starting LBA, transfer length, Inter LBA distance between I/O requests, measured time between requests, and measured latency of I/O request completions, during a training period. The model also takes inputs such as measured latency parameter as experienced by the host for an I/O and the frequency of the read/write on the LBA range in the last training interval.

For a read I/O request, the model predicts the starting LBA and the length of the read request to pre-fetch in case of sequential/random read. The predicted workload may be used for pre-fetching and optimizing read performance. As an example, the output of the predictive subsystem may be provided as an input to layers such as a cache manager, which may manage a caching implementation. The cache manager may provide measured input on the success of the predictive model (e.g., hit/miss ratios) of the pre-fetched pages to the LSTM subsystem. The LSTM subsystem can retrain the model using the hit/miss data and the requested pages information.

For a write I/O request, by utilizing the LSTM subsystem, the host I/O optimizer predicts the upcoming I/O pattern to determine a type of the write request (e.g., sequential/random), a probable size of the I/O request, a probable frequency of writing data on the LBA range and can prep the storage subsystem for optimization. An exemplary mechanism can be implemented to utilize a data set management command defined in the NVMe specification for I/O optimization.

In accordance with at least one embodiment, I/O parameters for which I/O parameter values can be provided to the predictive subsystem include an I/O type (e.g., read or write), a starting LBA, an I/O length, an inter-LBA distance, a measured latency of the I/O requests, and cache LBA hit/miss information. In accordance with at least one embodiment, an input to the LSTM subsystem provides such parameter values, which may be considered as the dimension of the input data [d]. The input can be normalized for all dimensions. The LSTM subsystem includes one visible layer and 'N' hidden LSTM cells followed by an output layer. The number of hidden cells may be determined empirically. Training of the LSTM subsystem may be carried out using back-propagation. The output of the LSTM subsystem may be provided as a vector, dimensionally similar to the input. This vector may then be inflated to produce the desired output.

In accordance with at least one embodiment, the predictive subsystem may provide as its outputs, anticipated read/write locations, size, and latency. The output of the LTSM logic can be used for the storage subsystem. The NVMe command set of DSM (Data Set Management) may be used to prepare the controller and/or the drives for the I/O workload. Similarly, the I/O advice hints grouping mode page may be set up for a SAS device or a controller that supports this page as part of its SCSI command set. Furthermore, the output of the predictive subsystem can be used as input for a storage controller with a proprietary command interface.

In accordance with at least one embodiment, a predictive subsystem allows a data storage controller to pre-fetch pages for random read operations and sequential read operations. The predictive subsystem optimizes I/O (both read and write) for SDS or a container solution by predicting upcoming I/O operation, pattern, and target device in multiple nodes and I/O attributes such as starting LBA, LBA range, expected number of changes in the LBA range, and necessary latency with sending dataset management commands to underlying controllers.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various Input/Output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as a circuit, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
in an information handling system comprising a processor, providing Input/Output (I/O) parameter values of parameters of a data storage controller to a recursive neural network (RNN) including a long short term memory (LSTM), wherein the I/O parameter values include a plurality of values selected from a group consisting of:
an I/O type being either a read or a write, a starting logical block address (LBA), and an inter-LBA distance between I/O requests, wherein the I/O parameter values further include a measured time between the I/O requests, wherein the I/O parameter values further include cache LBA hit-or-miss information;
in an I/O optimizer coupled to the LSTM, the I/O optimizer including a manager circuit providing controls signals to a plurality of control gates for controlling application of the I/O parameter values and prediction output in controlling operation of an I/O probe, the I/O probe obtaining instances of the I/O parameter values;
collecting the I/O parameter values by a collector circuit included in the I/O optimizer; providing a hit-and-miss measured input to the LSTM, by a decision engine included in the I/O optimizer; and
receiving the prediction output and providing decision information indicating a need for retraining the LSTM to the manager circuit by the decision engine, wherein the decision information indicating the need for retraining the LSTM is based on the hit-and-miss measured input.

2. The method of claim 1 further comprising:
measuring cache hit-and-miss information; and
determining, based on the cache hit-and-miss information, whether the RNN is to be retrained.

3. The method of claim 2 further comprising:
in response to determining the RNN is to be retrained, asserting a forget gate of the LSTM and providing a new random seed to the LSTM.

4. The method of claim 3 further comprising:
in response to determining the RNN is not to be retrained, providing an existing random seed to the LSTM.

5. The method of claim 1 further comprising:
issuing a non-volatile memory express (NVMe) data set management (DSM) command to configure a storage subsystem according to a model of an I/O pattern of accesses to data storage of the information handling system.

6. The method of claim 1 further comprising:
using an I/O advice hints grouping mode page to configure a storage subsystem according to a model of an I/O pattern of accesses to data storage of the information handling system.

7. The method of claim 1, wherein the plurality of values are selected from another group consisting of a transfer length, and a measured latency of I/O request completions.

8. An apparatus comprising:
a long short term memory (LSTM) configured to receive Input/Output (I/O) parameter values of parameters of a data storage controller and to produce a prediction output by operation of a recursive neural network (RNN), wherein the I/O parameter values include a plurality of values selected from a group consisting of: an I/O type being either a read or a write, a starting logical block address (LBA), and an inter-LBA distance between I/O requests, wherein the I/O parameter values further include a measured time between the I/O requests, wherein the I/O parameter values further include cache LBA hit-or-miss information; and
an I/O optimizer coupled to the LSTM to provide the I/O parameter values to the LSTM, and to receive the prediction output from the LSTM, the I/O optimizer including:
a manager circuit configured to provide control signals to a plurality of control gates for controlling application of the I/O parameter values and the prediction output to control operation of an I/O probe, the I/O probe to obtain instances of the I/O parameter values;
a collector circuit configured to collect the I/O parameter values; and
a decision engine coupled to the manager circuit and to the LSTM, the decision engine configured to provide a hit-and-miss measured input to the LSTM, to receive the prediction output from the LSTM, and to provide decision information indicating a need for retraining the LSTM to the manager circuit, wherein the decision information indicating the need for retraining the LSTM is based on the hit-and-miss measured input.

9. The apparatus of claim 8, wherein the LSTM comprises:
a plurality of LSTM cells;
an existing seed register coupled to each of the plurality of LSTM cells; and
a random seed generator coupled to each of the plurality of LSTM cells.

10. The apparatus of claim 9, wherein, when the decision engine provides the decision information indicating the need for retraining the LSTM, a forget gate for each of the plurality of LSTM cells is asserted, and the random seed generator provides a new random seed value to each of the plurality of LSTM cells.

11. The apparatus of claim 10, wherein, when the decision engine provides an indication that the LSTM need not be retrained, the existing seed register provides an existing seed value to each of the plurality of LSTM cells.

12. The apparatus of claim 8, wherein the I/O optimizer issues a non-volatile memory express (NVMe) data set management (DSM) command to configure a storage subsystem according to a model provided by the RNN.

13. The apparatus of claim 8, wherein the I/O optimizer uses an I/O advice hints grouping mode page to configure a storage subsystem according to a model provided by the RNN.

14. An information handling system comprising:
a data storage controller;
a long short term memory (LSTM) configured to receive Input/Output (I/O) parameter values of parameters of the data storage controller and to produce a prediction output by operation of a recursive neural network (RNN), wherein the I/O parameter values include a plurality of values selected from a group consisting of:
an I/O type being either a read or a write, a starting logical block address (LBA), and an inter-LBA distance between I/O requests, wherein the I/O parameter values further include a measured time between the I/O requests, wherein the I/O parameter values further include cache LBA hit-or-miss information; and
an I/O optimizer coupled to the data storage controller to improve I/O performance, the I/O optimizer coupled to the LSTM to provide the I/O parameter values to the LSTM and to receive the prediction output from the LSTM, the I/O optimizer including:
a manager circuit configured to provide control signals to a plurality of control gates for controlling application of the I/O parameter values and the prediction output to control operation of an I/O probe, the I/O probe to obtain instances of the I/O parameter values;
a collector circuit configured to collect the I/O parameter values; and
a decision engine coupled to the manager circuit and to the LSTM, the decision engine configured to provide a hit-and-miss measured input to the LSTM, to receive the prediction output from the LSTM, and to provide decision information indicating a need for retraining the LSTM to the manager circuit, wherein the decision information indicating the need for retraining the LSTM is based on the hit-and-miss measured input.

15. The information handling system of claim 14, wherein the LSTM comprises:
a plurality of LSTM cells;
an existing seed register coupled to each of the plurality of LSTM cells; and
a random seed generator coupled to each of the plurality of LSTM cells.

16. The information handling system of claim 15, wherein, when the decision engine provides the decision information indicating the need for retraining the LSTM, a forget gate for each of the plurality of LSTM cells is asserted, and the random seed generator provides a new random seed value to each of the plurality of LSTM cells.

17. The information handling system of claim 16, wherein, when the decision engine provides an indication that the LSTM need not be retrained, the existing seed register provides an existing seed value to each of the plurality of LSTM cells.

18. The information handling system of claim 14, wherein the I/O optimizer issues a non-volatile memory express (NVMe) data set management (DSM) command to configure a storage subsystem according to a model provided by the RNN.

19. The information handling system of claim 14, wherein the I/O optimizer uses an I/O advice hints grouping mode page to configure a storage subsystem according to a model provided by the RNN.

* * * * *